(12) United States Patent
Spector et al.

(10) Patent No.: US 11,748,725 B2
(45) Date of Patent: Sep. 5, 2023

(54) SYSTEM AND METHOD FOR BILLPAY USING CREDIT-BASED PRODUCTS

(71) Applicant: JPMORGAN CHASE BANK, N.A., New York, NY (US)

(72) Inventors: Howard Spector, Woolwich, NJ (US); Krishna K. Bhagavatula, Los Altos, CA (US); Scott H. Ouellette, Kingston, NH (US); Winter P. Ng, Lutz, FL (US); Devin C. Moore, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/426,505

(22) Filed: May 30, 2019

(65) Prior Publication Data

US 2019/0370768 A1    Dec. 5, 2019

Related U.S. Application Data

(60) Provisional application No. 62/678,021, filed on May 30, 2018.

(51) Int. Cl.
*G06Q 20/14*    (2012.01)
*G06Q 20/04*    (2012.01)
(Continued)

(52) U.S. Cl.
CPC ......... *G06Q 20/14* (2013.01); *G06Q 20/0425* (2013.01); *G06Q 20/24* (2013.01); *G06Q 20/342* (2013.01)

(58) Field of Classification Search
CPC .... G06Q 20/14; G06Q 20/0425; G06Q 20/24; G06Q 20/342
See application file for complete search history.

(56) References Cited

U.S. PATENT DOCUMENTS

| | | | |
|---|---|---|---|
| 2004/0158522 A1* | 8/2004 | Brown | G06Q 20/34 705/40 |
| 2005/0149394 A1* | 7/2005 | Postrel | G06Q 30/02 705/14.25 |

(Continued)

OTHER PUBLICATIONS

International Search Report and Written Opinion of the International Searching Authority, dated Aug. 16, 2019, from corresponding International Application No. PCT/US2019/034588.

(Continued)

*Primary Examiner* — Bruce I Ebersman
*Assistant Examiner* — Matthew Cobb
(74) *Attorney, Agent, or Firm* — GREENBERG TRAURIG LLP (57) ABSTRACT

Systems and methods for online billpay using credit products are disclosed. In one embodiment, in an information processing apparatus comprising at least one computer processor, a method for online billpay using a credit product may include: (1) receiving, from a customer, an identification of a merchant for online credit-based bill pay; (2) retrieving accepted payment mechanisms from the merchant; (3) selecting a payment mechanism from the accepted payment mechanisms; (4) receiving an invoice for a customer transaction with the merchant from the merchant; (5) conducting a payment transaction with the selected payment mechanism; and (6) charging the payment transaction to a credit account associated with the customer.

19 Claims, 4 Drawing Sheets

(51) Int. Cl.
*G06Q 20/34* (2012.01)
*G06Q 20/24* (2012.01)

(56) References Cited

U.S. PATENT DOCUMENTS

| | | | |
|---|---|---|---|
| 2005/0283436 A1* | 12/2005 | Greer | G06Q 20/4037 |
| | | | 705/40 |
| 2006/0074799 A1* | 4/2006 | Averyt | G07F 7/0873 |
| | | | 705/40 |
| 2008/0249931 A1 | 10/2008 | Gilder et al. | |
| 2009/0070260 A1* | 3/2009 | Flitcroft | G06Q 20/3552 |
| | | | 705/41 |
| 2009/0292642 A1 | 11/2009 | Han | |
| 2011/0208649 A1 | 8/2011 | Shader et al. | |
| 2012/0179558 A1* | 7/2012 | Fischer | G06Q 20/20 |
| | | | 705/16 |
| 2013/0297487 A1* | 11/2013 | MacGuire | G06Q 20/105 |
| | | | 705/38 |
| 2014/0108172 A1* | 4/2014 | Weber | G06Q 30/00 |
| | | | 705/17 |
| 2014/0156520 A1 | 6/2014 | Kelly et al. | |
| 2014/0279474 A1* | 9/2014 | Evans | G06Q 20/40 |
| | | | 705/41 |
| 2015/0178693 A1 | 6/2015 | Solis | |

OTHER PUBLICATIONS

Extended European Search Report, dated Jan. 31, 2022, from corresponding European Application No. 19810449.9.

* cited by examiner

SYSTEM AND METHOD FOR BILLPAY USING CREDIT-BASED PRODUCTS

RELATED APPLICATIONS

This application claims the benefit of and priority to U.S. Provisional Patent Application Ser. No. 62/678,021, filed May 30, 2018, the disclosure of which is hereby incorporated by reference in its entirety.

BACKGROUND OF THE INVENTION

1. Field of the Invention

The present disclosure generally relates to systems and methods for online billpay using credit products.

2. Description of the Related Art

The use of online billpay using credit-based products is difficult. Billers generally do not accept credit cards for payment unless the customer provides the credit card information to the biller directly (e.g., via the biller's website, over the phone, in person, etc.). So, a customer wishing to pay bills using a credit card must set up an online account with each biller, and then provide credit card information to each biller.

SUMMARY OF THE INVENTION

Systems and methods for online billpay using credit products are disclosed. In one embodiment, in an information processing apparatus comprising at least one computer processor, a method for online billpay using a credit product may include: (1) receiving, from a customer, an identification of a merchant for online credit-based bill pay; (2) retrieving accepted payment mechanisms from the merchant; (3) selecting a payment mechanism from the accepted payment mechanisms; (4) receiving an invoice for a customer transaction with the merchant from the merchant; (5) conducting a payment transaction with the selected payment mechanism; and (6) charging the payment transaction to a credit account associated with the customer.

In one embodiment, the accepted payment mechanisms may include a credit card payment, ACH payment, a check payment, an EFT transfer, an inter-bank funds transfer, etc.

In one embodiment, the step of conducting a payment transaction with the selected payment mechanism may include generating a single-use credit card number or stored value card number for a card payment, and funding the single-use credit card number or stored value card with funds from the credit account associated with the customer for an amount of the invoice.

In another embodiment, the step of conducting a payment transaction with the selected payment mechanism may include generating a merchant-specific single-use credit card number or stored value card number for a card payment, and funding the merchant-specific single-use credit card or stored value card with funds from the credit account associated with the customer for an amount of the invoice.

In one embodiment, the method may further include receiving a second invoice from the merchant; and funding the merchant-specific single-use credit card or stored value card with funds from the credit account associated with the customer for an amount of the second invoice.

In one embodiment, the step of conducting a payment transaction with the selected payment mechanism may include providing the merchant with a check for an amount of the invoice. The check is may be electronic check.

In one embodiment, the step of charging the payment transaction to a credit account associated with the customer may include redeeming customer reward points for an amount of the invoice, providing the customer with a cash advance for an amount of the invoice, etc.

According to another embodiment, a system for online billpay using a credit product may include a financial institution backend comprising at least one computer processor and hosting a credit-based online bill payment service; and a merchant. In one embodiment, the financial institution backend may perform the following: receive an identification of the merchant for online credit-based bill pay from a customer; retrieve accepted payment mechanisms from the merchant; select a payment mechanism from the accepted payment mechanisms; receive an invoice for a customer transaction with the merchant from the merchant; conduct a payment transaction with the selected payment mechanism; and charge the payment transaction to a credit account associated with the customer.

In one embodiment, the accepted payment mechanisms may include at least one of a credit card payment, ACH payment, a check payment, an EFT transfer, an inter-bank funds transfer, etc.

In one embodiment, the financial institution backend may conduct the payment transaction with the selected payment mechanism by generating a single-use credit card number or stored value card number for a card payment and funding the single-use credit card number or stored value card with funds from the credit account associated with the customer for an amount of the invoice.

In one embodiment, the financial institution backend may conduct the payment transaction with the selected payment mechanism by generating a merchant-specific single-use credit card number or stored value card number for a card payment, and funding the merchant-specific single-use credit card or stored value card with funds from the credit account associated with the customer for an amount of the invoice.

In one embodiment, the financial institution backend may receive a second invoice from the merchant, and may fund the merchant-specific single-use credit card or stored value card with funds from the credit account associated with the customer for an amount of the second invoice.

In one embodiment, the financial institution backend may conduct the payment transaction with the selected payment mechanism by providing the merchant with a check for an amount of the invoice. The check may be an electronic check.

In one embodiment, the financial institution backend may charge the payment transaction to a credit account associated with the customer by redeeming customer reward points for an amount of the invoice, by providing the customer with a cash advance for an amount of the invoice, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein relate to systems and methods for online billpay using credit-based products.

In embodiments, even though the payment may be made from a temporary account or other means, the end result is a charge against the customer's credit account or reward account.

Embodiments may use a dynamically generated convenience check against the customer's credit account and send that convenience check to the biller. Thus, the biller may accept payment from the credit card without even knowing it.

Embodiments may leverage a payment network or API gateway that allows merchants to accept the customer's credit account credentials dynamically so they can run the transaction themselves.

Embodiments may convert reward points to cash, and may deposit the cash into an account (e.g., a temporary account). The funds in the account may be used for an ACH transaction, or a check transaction, to pay the merchant.

Figure 1:
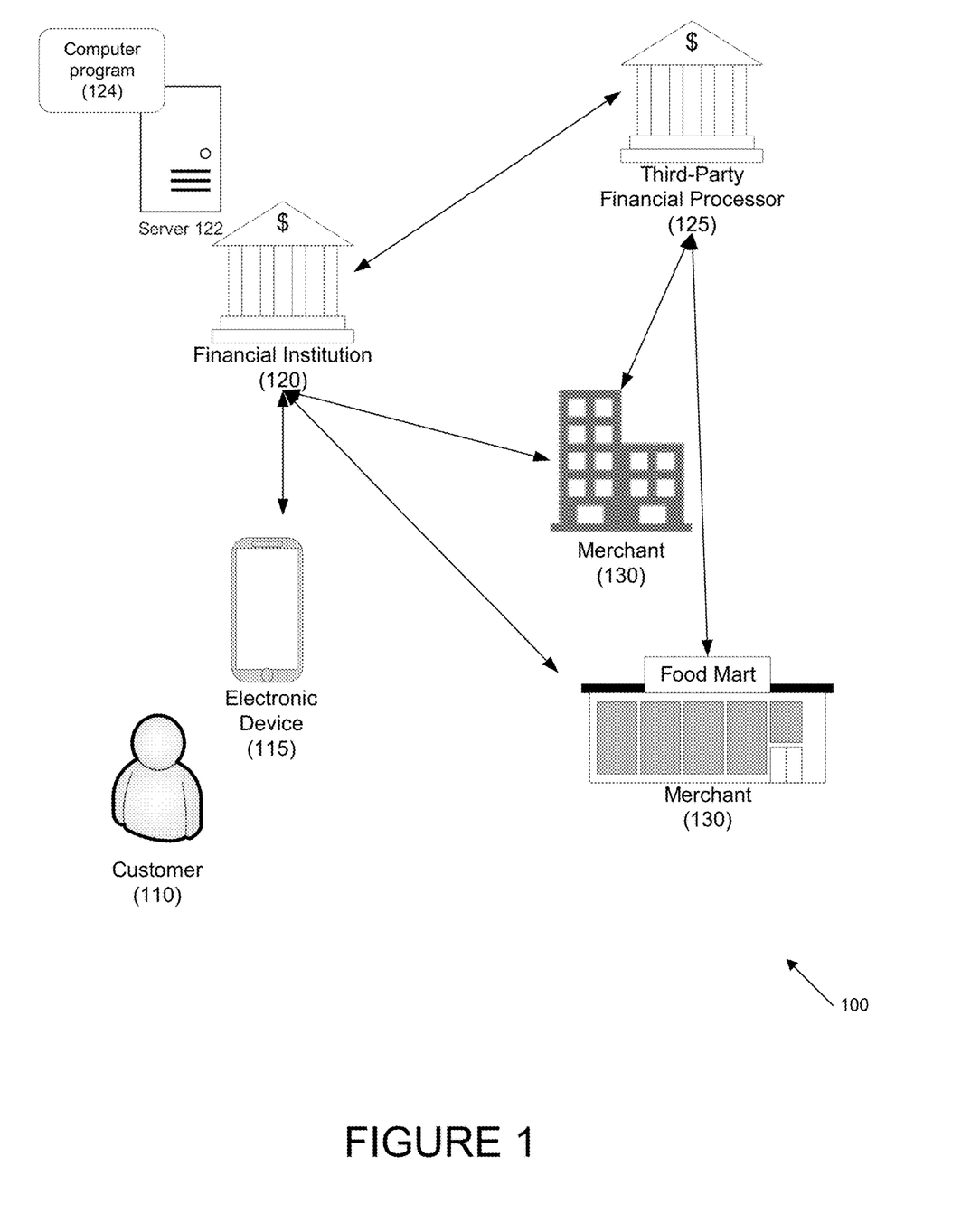
FIG. 1 depicts a system for online billpay using credit products according to one embodiment.

Referring to FIG. 1, a system for online billpay using credit-based products is provided according to one embodiment. System 100 may include customer 110 that uses electronic device 115. The electronic device may be a smartphone, smart watch, computer (e.g., tablet computer, laptop/notebook computer, desktop computer, etc.), a kiosk, an ATM, an Internet of Things ("IoT") appliance, etc.

Customer 110 may interact with financial institution 120 using electronic device 115. Financial institution 120 may be a bank, credit union, or any other provider of financial services.

Financial institution 120 may host one or more accounts for customer 110, such as a credit-based account (e.g., the financial institution may be a credit card issuer), a rewards-based account, deposit accounts, etc.

Financial institution 120 may host one or more computing devices 122, such as a server, that may execute computer program 124 that provides credit-based bill payment. In one embodiment, computing device(s) 122 may be provided in the cloud, and computer program 124 may be a cloud-based service.

Customer 110 may use an online billpay service executed by computer program 124. Customer 110 may access the online billpay service using a computer program or application (not shown) on electronic device 115, a browser, etc. In one embodiment, the online billpay service may allow customer 110 to make payments to one or more merchant 130 using a credit-based account (e.g., a credit card) or a rewards-based account (e.g., rewards or loyalty points). For example, when customer 110 receives a bill from merchant 130, customer 110 may request that the bill be paid by financial institution 120 using one of customer's 110 credit-based accounts or rewards accounts.

Merchant 130 may be any sort of entity that provides a good or service to customer 110, including, for example, brick-and-mortar retailers, online retailers, utility providers, and individuals. Any suitable merchant that may invoice customer 110 for goods or services may be included as is necessary and/or desired.

Although FIG. 1 depicts only two merchants 130, it should be recognized that a greater number or fewer number of merchants 130 may be provided.

In one embodiment, merchants 130 may provide invoices for goods or services to financial institution 120. In one embodiment, the invoices may be provided to computer program 124 electronically, to financial institution 120 by mail, etc.

In one embodiment, third-party financial processor 125 may also interface with one or more merchant 130 to process payments. In such a situation, financial institution 120 may function as a broker.

For example, merchant 130 may use third-party financial processor 125, so that when customer 110 pays his or her credit card, financial institution 120 may have third-party financial processor pay merchant 130 instead of paying merchant 130 directly. In this manner, merchant 130 does not need to have an account with financial institution 120 to use the credit card bill pay system, although merchant 130 may be required to onboard the credit card billpay system in order to use it.

Figure 2:
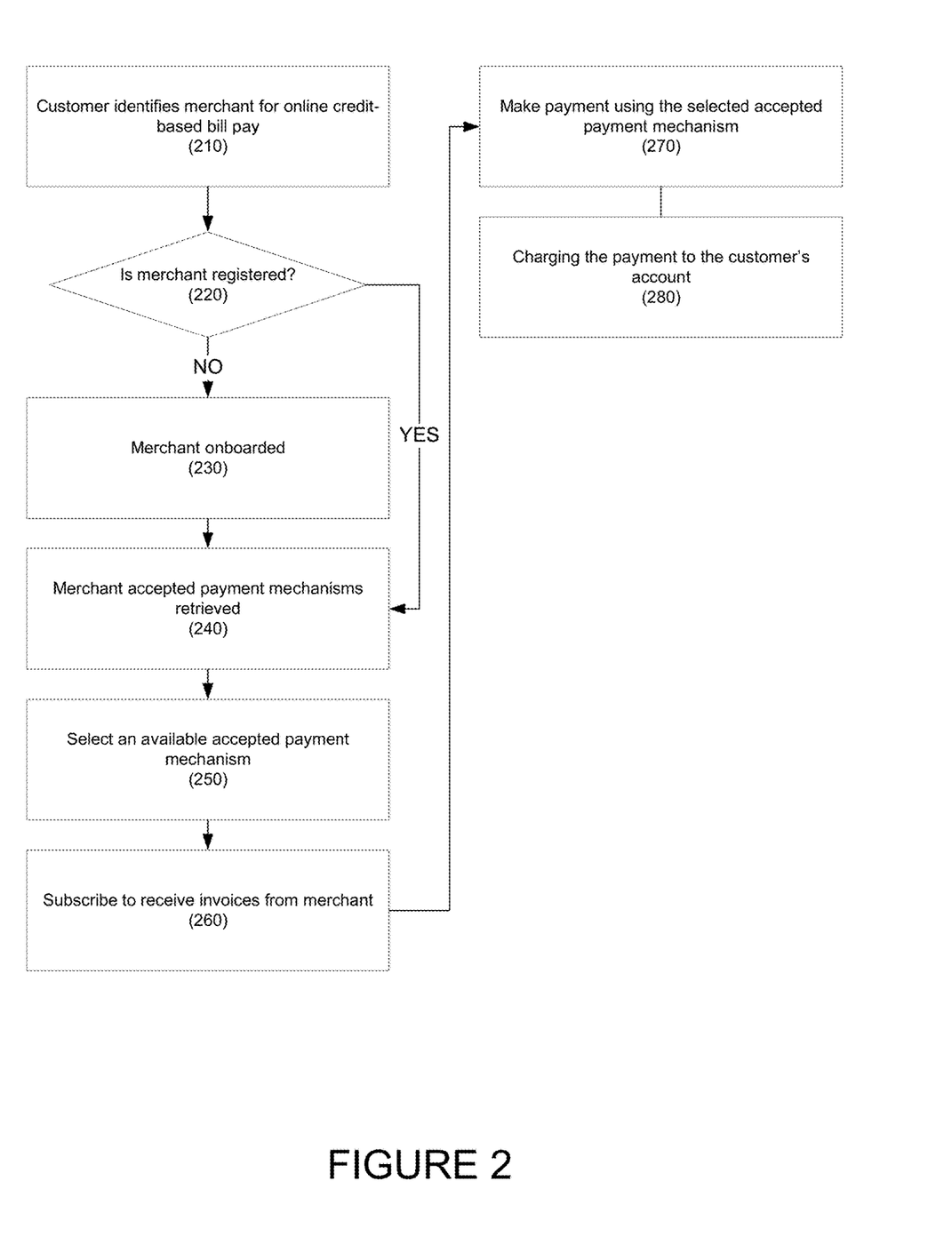
FIG. 2 depicts a method for online billpay using credit products according to one embodiment.

Referring to FIG. 2, a method for online billpay using credit-based products is provided according to one embodiment. In step 210, a customer of a financial institution may receive a bill from a merchant, or may request payment to a merchant using the financial institution's online credit-based billpay system. In one embodiment, the customer may access the online billpay system using an electronic device (e.g., a smartphone, smartwatch, computer, kiosk, ATM, IoT appliance, etc.), a browser, etc.

In step 220, a backend for the financial institution may determine if the identified merchant is registered.

If the merchant is not registered, in step 230, the backend may communicate with the merchant (e.g., by email, text, etc.) to receive information about the merchant. For example, the financial institution may determine the types of payments accepted (e.g., credit, check, rewards, ACH, etc.) by the merchant, address information, etc.

In one embodiment, the financial institution may provide APIs to allow the merchant to conduct the transaction. For example, APIs may be provided at the time of onboarding via electronic documentation including WSDL or other self-discovered APIs, human-readable documentation, etc.

In one embodiment, a traditional credit card processing API at the frontend may process the credit card side of the transaction, and, depending on how the merchant is to be paid, the backend may select the appropriate API to use.

In one embodiment, the merchant may be provided with an incentive (e.g., no or lower cost, etc.) to register if the merchant has one or more accounts with the financial institution.

In step 240, the accepted payment mechanism, such as those received in step 230, may be retrieved for the merchant, and in step 250, an accepted payment mechanism may be selected for the bill payment.

In one embodiment, the accepted payment mechanism may be selected, at the merchant's discretion, from the various legacy payment methods the merchant may be using. The cost may be transparent to the merchant so that the less expensive option, which may not be compatible with the merchant's systems, is visible. This may provide an incentive for merchants to move from legacy payment systems.

The merchant may be able to change payment mechanism(s) as necessary and/or desired.

In step 260, the backend may subscribe to receive invoices from the merchant. For example, the backend may provide a notification that invoices are to be communicated to the financial institution electronically, by mail, etc.

In step 270, payment may be made to the merchant using the payment mechanism selected by the merchant.

In one embodiment, if the merchant does not accept credit cards from the financial institution for the customer's online billpay, but does accept checks, the backend may generate a convenience check that is associated with the customer's credit-based account for the payment, and may provide the check by mail or electronically to the merchant.

In one embodiment, if the merchant also has an account with the financial institution, the financial institution may transfer funds to the merchant's account within the financial institution, and may charge the customer's credit account.

If the merchant accepts credit cards, the financial institution may provide the merchant with a single-use credit card number, a token, etc. that is funded by the customer's credit account for the amount. In one embodiment, the financial institution may automatically generate the single-use credit card number and provide it to the merchant. The merchant may then execute a transaction for the amount using the single-use credit card number.

In another embodiment, the backend may provide the merchant with a merchant-specific credit card number or token, and may fund it for the amount of each invoice from the merchant. Thus, the same credit card number may be used.

If the customer wishes to use reward points, the backend may convert the requisite reward points to a cash value, and may fund a stored value card, single use credit card, etc. that may be provided to the merchant for the bill. For example, the financial institution may generate a single-use credit card for the value of the converted reward points, and may provide the number to the merchant.

If the merchant accepts ACH transactions, the backend may transfer funds from the customer's credit account into an account (e.g., a temporary account, a generic ACH account, a sub-account for the customer, etc.), and may use ACH to provide the merchant with payment.

In another embodiment, the payment may be made as a cash advance to the customer's credit card, where standard cash advance rules would apply to make the payment equivalent to paying with cash.

In another embodiment, EFT and/or wire transfers may be used if the merchant accepts such. The backend may transfer funds from the customer's credit account into an account (e.g., a temporary account, a generic account, a sub-account for the customer, etc.), and may use EFT or wire transfer to provide the merchant with payment.

In step 280, the amount of the payment may be charged to the customer's credit account.

In one embodiment, the customer may be incentivized such that if the customer has more accounts with the financial institution, the customer may potentially have more payment options (e.g., draft against bank account unless there are insufficient funds, and in that case, draft it against the credit card automatically rather than over drafting their insufficiently funded account).

The customer's pay journey to a registered merchant is between pay with credit and pay with cash plus credit fallback. The actual payment method may not be visible to the customer beyond this distinction.

In one embodiment, for certain merchants (e.g., restaurants, rental car providers, hotels, etc.) a temporary card or account may be generated for pre-authorization when the customer used a check card or credit card so that the pre-authorization does not tie up funds or credit.

For example, the preauthorization may be made to a separate account that may have a credit limit set to the amount of the transaction plus an additional amount for preauthorization. This may be based on, for example, the customer's credit history.

If the additional amount is not included, overdraft may be used to cover the preauthorization amount. The overdraft may be at any time, including before the transaction, or after the transaction. In one embodiment, the overdraft may be charged against another credit product that the customer may have with the financial institution.

Figure 3:
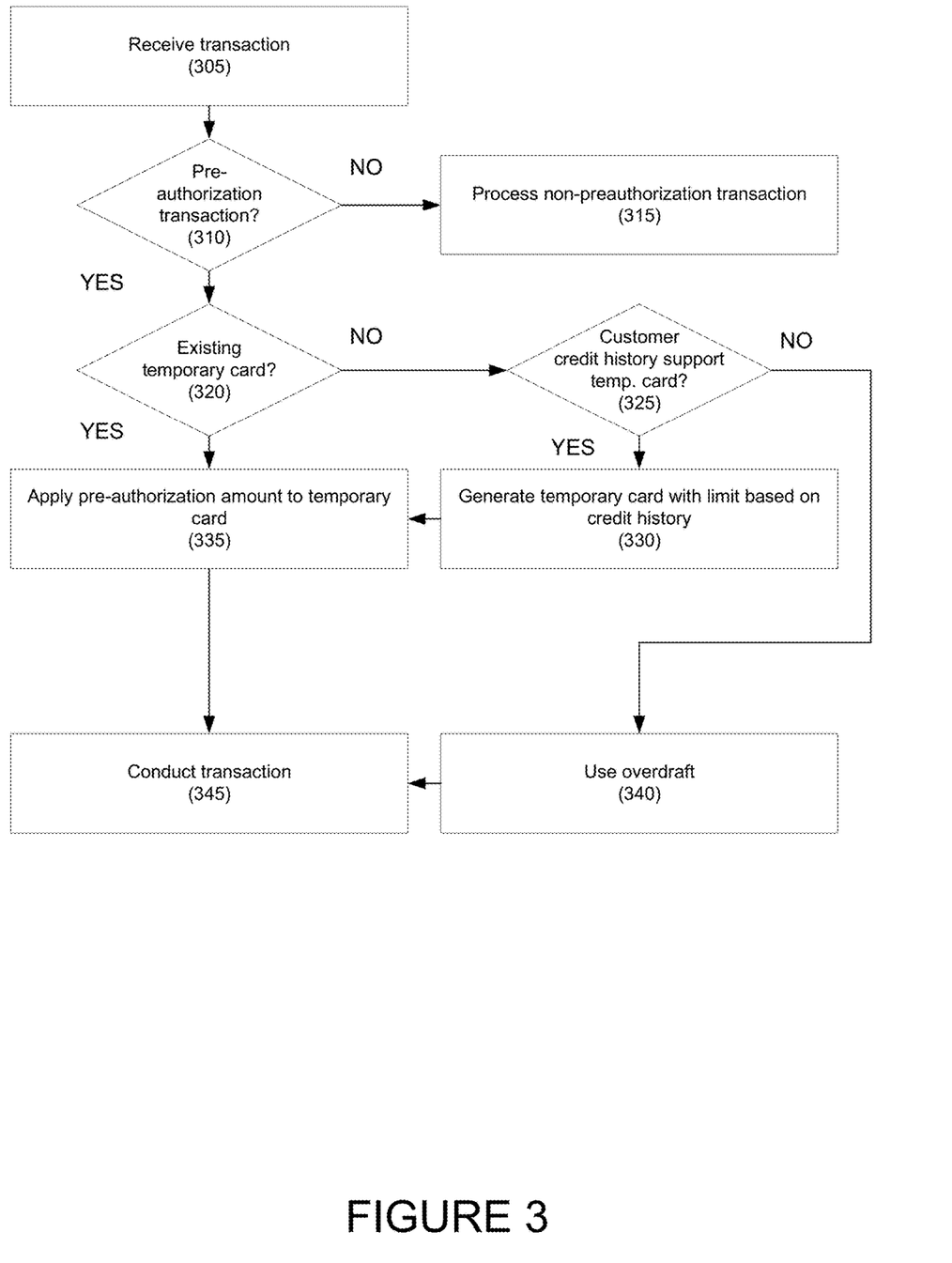
FIG. 3 depicts a method for conducting a transaction requiring pre-authorization according to one embodiment.

Referring to FIG. 3, an exemplary method for conducting a transaction requiring pre-authorization is disclosed according to one embodiment.

In step 305, a transaction may be received, and, in step 310, the transaction may be checked to determine if preauthorization is required. If it is not, in step 315, the transaction may be conducted in the usual manner.

If preauthorization is required, in step 320, a check is made to see if the customer has been issued a temporary card, such as a temporary credit card. If the customer does not have a temporary card, in step 325, the customer's credit history, etc. may be reviewed to determine if the customer should be issued a temporary card. If the customer's credit history and other data supports the temporary card, in step 330, a temporary card may be generated for the customer.

If the customer's credit history does no support a temporary card, in step 340, the customer's overdraft protection (if available) may be used.

In step 335, the pre-authorization amount may be applied to the temporary card, and in step 345, the transaction may be conducted with either the temporary card or the overdraft protection.

In one embodiment, if currency conversion is necessary, it may be automatically completed at market rates. For example, referring to FIG. 4, e.

Figure 4:
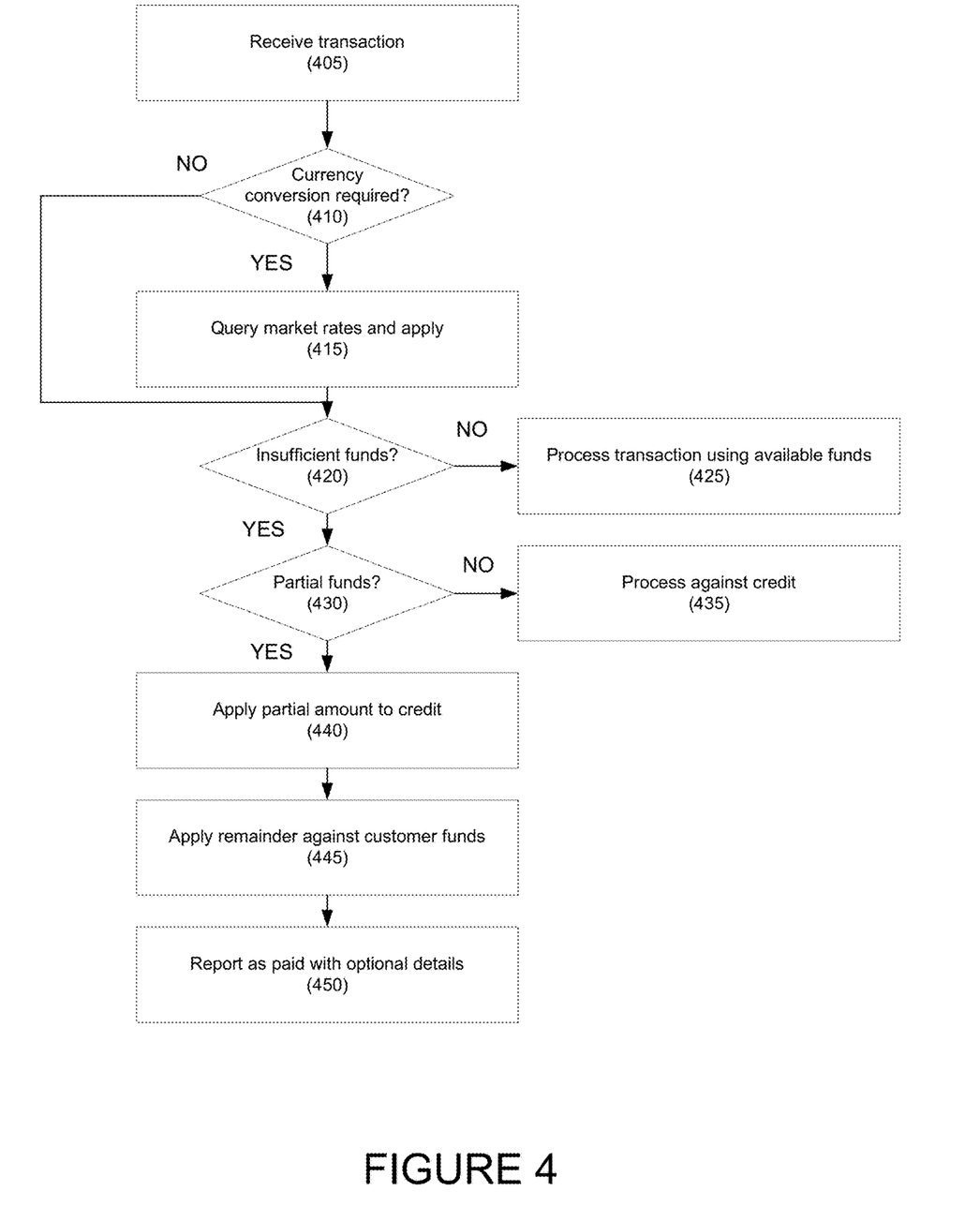
FIG. 4 depicts a method for conducting a transaction according to one embodiment.

In step 405, a transaction may be received, and, in step 410, a check may be made as to whether currency conversion for the amount of the transaction is necessary. If currency conversion is necessary, in step 415, market rates may be queried and may be applied to the amount of the transaction.

If currency conversion is not required, or after currency conversion is complete, in step 420, a check may be made against the customer's account balance to see if the customer has insufficient funds for the transaction. If the customer does not have insufficient funds (i.e., the customer can fund the transaction), in step 425, the transaction may be processed using the customer's available funds.

If the customer has insufficient funds, in step 430, a check is made to see if the customer has partial funds available. If the customer does not have partial funds available, in step 435, the transaction may be processed using the customer's credit account, including credit cards, alternative credit products, lines of credit, etc.

If the customer has partial funds available, in step 440, a partial amount of the transaction may be applied against a credit product (e.g., credit cards, alternative credit products, lines of credit, etc.), and in step 445, the remaining amount may be applied against the customer's funds. In one embodiment, the amount that is applied against each may be set by the customer.

In step 450, the transaction may be reported as paid, and details (e.g., amount paid with credit, customer funds, etc.) may be made available.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for online billpay using a credit product, comprising:
   receiving, at an information processing apparatus and from a user interface, an identification of a merchant for online credit-based bill pay;
   sending, by the information processing apparatus, an electronic communication to the merchant, wherein the electronic communication requests an indication of payment mechanisms accepted by the merchant;
   receiving, by the information processing apparatus, a plurality of accepted payment mechanisms from the merchant, wherein one of the plurality of accepted payment mechanisms comprises a payment-by-credit card payment mechanism;
   selecting, by the information processing apparatus, the payment-by-credit card payment mechanism from the plurality of accepted payment mechanisms;
   receiving, by the information processing apparatus, a selection of a credit card for paying the merchant;
   receiving, by the information processing apparatus, an invoice for a customer transaction with the merchant, the invoice including an indication of a monetary amount owed to the merchant;
   determining, by the information processing apparatus, that payment of the invoice using the payment-by-credit card payment mechanism requires preauthorization;
   generating, by the information processing apparatus, a temporary credit account and setting a credit limit of the temporary credit account to a preauthorization amount that includes the monetary amount owed to the merchant plus an additional amount for preauthorization;
   conducting, by the information processing apparatus, the customer transaction for the monetary amount and a pre-authorization amount with the temporary credit account using the selected payment-by-credit card payment mechanism; and
   charging, by the information processing apparatus, the monetary amount to the selected credit card.

2. The method of claim 1, wherein the plurality of accepted payment mechanisms further comprise an automated clearing house (ACH) payment, a check payment, an electronic funds transfer (EFT) transfer, and an inter-bank funds transfer.

3. The method of claim 1, further comprising checking, by the information processing apparatus, a credit history of the customer prior to generating the temporary credit account.

4. The method of claim 3, wherein the temporary credit account is generated based on the credit history of the customer.

5. The method of claim 1, further comprising:
receiving, by the information processing apparatus, a second invoice from the merchant; and
funding, by the information processing apparatus, a single-use credit card number or stored value card number with funds from the credit card associated with the customer for an amount of the second invoice.

6. The method of claim 1, further comprising:
providing, by the information processing apparatus, the merchant with a check for the monetary amount.

7. The method of claim 6, wherein the check is an electronic check.

8. The method of claim 1, wherein the step of charging the monetary amount to the selected credit card comprises:
redeeming customer reward points for the monetary amount.

9. The method of claim 1, wherein the step of charging the monetary amount to the selected credit card comprises:
providing the customer with a cash advance for the monetary amount.

10. The method of claim 1, wherein the temporary credit account represents a set of payment accounts, and further comprising:
comparing, by the information processing apparatus, the monetary amount owed to the merchant with a first value of a first payment account in the set of payment accounts or a second value of a second payment account in the set of payment accounts; and
responsive to determining that the value of invoice is greater than the first value or the second value, setting, by the information processing apparatus, a value of the temporary credit account to an amount greater than the monetary amount owed to the merchant.

11. A system for online billpay using a credit product, comprising:
a financial institution backend comprising at least one computer processor and hosting a credit-based online bill payment service,
wherein the financial institution backend performs the following:
receive, from a user interface of the credit-based online bill payment service, an identification of a merchant for online credit-based bill pay from a customer;
send an electronic communication to the merchant, wherein the electronic communication requests an indication of payment mechanisms accepted by the merchant;
receive a plurality of accepted payment mechanisms from the merchant, wherein one of the plurality of accepted payment mechanisms comprises a payment-by-credit card payment mechanism;
select, by the financial institution backend, the payment-by-credit card payment mechanism from the plurality of accepted payment mechanisms;
receive a selection of a credit card for paying the merchant;
receive an invoice for a customer transaction with the merchant, the invoice including an indication of a monetary amount owed to the merchant; and
generate a temporary credit account and set a credit limit of the temporary credit account to a preauthorization amount that includes the monetary amount owed to the merchant plus an additional amount for preauthorization;
conduct the customer transaction for the monetary amount and a pre-authorization amount with the temporary credit account using the selected payment-by-credit card payment mechanism; and
charge the monetary amount to the selected credit card.

12. The system of claim 11, wherein the plurality of accepted payment mechanisms further comprise an automated clearing house (ACH) payment, a check payment, an electronic funds transfer (EFT) transfer, and an inter-bank funds transfer.

13. The system of claim 11, wherein the financial institution backend checks a credit history of the customer prior to generating the temporary credit account.

14. The system of claim 13, wherein the temporary credit account is generated based on the credit history of the customer.

15. The system of claim 14, wherein the financial institution backend further receives a second invoice from the merchant, and funds a single-use credit card number or stored value card number with funds from the credit card associated with the customer for the monetary amount.

16. The system of claim 11, wherein the financial institution backend conducts the customer transaction with the selected payment-by-credit card payment mechanism by providing the merchant with a check for the monetary amount.

17. The system of claim 16, wherein the check is an electronic check.

18. The system of claim 11, wherein the financial institution backend charges the monetary amount to the selected credit card by redeeming customer reward points for the monetary amount.

19. The system of claim 11, wherein the financial institution backend charges the monetary amount to the selected credit card by providing the customer with a cash advance for the monetary amount.

* * * * *